US005486253A

United States Patent [19]

Otruba

[11] Patent Number: 5,486,253

[45] Date of Patent: Jan. 23, 1996

[54] METHOD OF LABELING CONTAINERS

[75] Inventor: Svatoboj Otruba, Ceres, Calif.

[73] Assignee: B&H Manufacturing Company, Ceres, Calif.

[21] Appl. No.: 443,317

[22] Filed: May 17, 1995

[51] Int. Cl.[6] .................................................. B32B 31/00

[52] U.S. Cl. .......................... 156/215; 156/256; 156/446; 156/567; 156/DIG. 31; 271/276

[58] Field of Search ............................ 156/86, 215, 256, 156/308.6, 446, 449, 450, 456, 520, 521, 566, 567, 568, 571, DIG. 26, DIG. 31; 271/276

[56] References Cited

U.S. PATENT DOCUMENTS

| | | | |
|---|---|---|---|
| 3,663,012 | 5/1972 | Van Den Honert | 271/276 |
| 3,779,829 | 12/1973 | Wolff | 156/361 |
| 3,957,570 | 5/1976 | Helm | 156/519 |
| 4,108,710 | 8/1978 | Hoffmann | 156/450 |
| 4,145,040 | 3/1979 | Huber | 271/276 |
| 4,526,645 | 7/1985 | Malthouse et al. | 156/350 |
| 4,549,454 | 10/1985 | Yamashita | 83/27 |
| 4,589,945 | 5/1986 | Polit | 156/497 |
| 4,641,558 | 2/1987 | Hoffmann | 83/152 |
| 4,647,333 | 3/1987 | Voltmer et al. | 156/351 |
| 4,671,843 | 6/1987 | Olsen | 156/450 |
| 4,687,535 | 8/1987 | Voltmer | 156/361 |
| 4,816,105 | 3/1989 | Yamashita | 156/267 |
| 5,061,334 | 10/1991 | Paules | 156/235 |
| 5,183,252 | 2/1993 | Wolber et al. | 271/276 |
| 5,405,487 | 4/1995 | Galchetski et al. | 156/566 |

*Primary Examiner*—James Engel
*Attorney, Agent, or Firm*—Brooks & Kushman

[57] ABSTRACT

A method of labeling containers utilizing a labeler having multiple port vacuum drum is disclosed. The multiple port vacuum drum has a first cavity which is supplied with one level of vacuum suitable for picking up label segments from a cutter with limited tension. The vacuum drum has a second cavity which is supplied with another, higher level of vacuum suitable for firmly griping the label segments as an adhesive of the like is applied to the label segment. The second cavity may be further divided into a label application segment with lower vacuum pressure. The cutter drum has an arcuate cavity to which vacuum is supplied at the end first contacting the labeling material web with reduced vacuum being provided at the label cut off point and label release point.

15 Claims, 4 Drawing Sheets

METHOD OF LABELING CONTAINERS

TECHNICAL FIELD

The present invention relates to a method of labeling containers in which a vacuum drum is used to support segments of label material with different levels of vacuum being supplied within the vacuum drum to provide improved control over label segments during processing.

BACKGROUND ART

Labeling containers by applying preprinted film labels is becoming an increasingly popular alternative to conventional lithography. Various environmental problems, including air pollution and recycling concerns strongly favor adoption of preprinted films for labeling containers. Plastic containers, metal cans and glass bottles can be labeled effectively with film labels.

Cost considerations have led to the development of thin films which have the advantage of reducing the cost of materials used but require increasingly more stringent process controls to allow high speed labeling equipment to handle thin, stretchable, and relatively flimsy labeling materials.

Labeling speed is an important consideration in high production canning and bottling plants, since it is unacceptable for labeling processes to impede productivity of a bottling or canning line. Labeling speed is of paramount importance with labeling speeds in excess of ten containers per second being possible to achieve with some labeling materials. Generally, thicker materials that are resistant to stretching are easier to handle by conventional labeling machines.

When thin labeling materials are run at high speeds, problems, such as label splitting, stretching labels and misalignment of labels, are encountered. With roll fed labels, when the labels are cut from the web of label material, excessive tension on the label can cause the labels to split instead of being cut. Similarly, overtensioning thin labels can cause the labels to stretch as they are applied to the vacuum drum. As the labels are transferred to a vacuum drum, excessive vacuum can cause the label segment to shift or snap leading to misaligned labels on the containers.

Some labeling materials include coatings or treatments that result in higher coefficients of friction that can interfere with the labeling process. Labels having a higher coefficient of friction tend to become overtensioned more easily which aggravates problems associated with overtensioning.

Another problem encountered when labels are supported by a vacuum drum during the labeling process is that glue applicators for applying glue to the label segments can become jammed by labels if insufficient vacuum is provided to prevent the labels from following the glue applicator.

With roll fed labeling operations, a vacuum label retention system on a label cutter may be used to hold the end of the label material web while segments are cut-off prior to supplying the segments to the vacuum drum. It has been found that the vacuum port location on the cutter drum can be set to increase vacuum at the point which the label web is fed to the cutter while decreasing vacuum pressure at the cut-off knife location.

Utilization of a single vacuum source for both the cutter and vacuum drum can cause variation in vacuum pressure that can lead to slippage or jamming of labelling.

The primary objective of the present invention is to provide a labeling system utilizing a plurality of cavities for providing different levels of vacuum, wherein thin films can be swiftly and accurately applied with minimum scrap or wastage.

It is another object of the invention to provide a method of labeling containers, wherein ultra-thin stretchable film can be applied without reducing labeling speeds or overtensioning label material during the labeling process.

These and other objects of the invention are achieved by the novel and useful methods of the present invention.

SUMMARY OF THE INVENTION

According to the present invention, a method of labeling containers is disclosed wherein a web of labeling material is supplied which is severed into label segments that are subsequently fed as label segments to a vacuum drum. The label segments are picked up by the vacuum drum with a first level of vacuum being supplied through a first cavity defined in the vacuum drum. The label segments are then held on the vacuum drum with a second level of vacuum supplied through a second cavity located within the vacuum drum which is separate from the first cavity. In one embodiment, the second level of vacuum is greater than the first level of vacuum. The label segments are acted on while the label segments are held on the vacuum drum, and the labels are subsequently applied to the containers.

Another aspect of the method includes the step of providing a differential vacuum at the cutter of the labeling machine with the cutter being provided with slightly higher vacuum at the point where the web of labeling material is fed into the cutter and a lesser degree vacuum adjacent the cut-off knife. The reduced vacuum within the arcuate cavity adjacent the knife reduces tension on the web of labeling material during the severing step. The increased vacuum adjacent the vacuum supply port allows increased holding force to be applied to the web at the point the label web is picked up by the cutter.

According to another aspect of the invention, the label material is supplied from a roll of label material. The step of feeding the label segments to the vacuum drum advantageously begins prior to the completion of the severing step with the reduced level vacuum in the first cavity serving to reduce tension on the label segments. By reducing vacuum on the label segments at this critical point misalignment on the vacuum drum and label splitting, or breakage, prior to completion of the severing step is minimized.

According to another aspect of the invention, the step of acting on the label segments may comprise applying an adhesive to a predetermined location on the label segments. The adhesive may be a solvent which forms an adherent surface in situ, or alternatively, the adhesive may be a hot or cold glue composition. It is also possible that the step of acting on the label segment may comprise localized heating of the label by convection, contact or radiant energy.

The method may also include the step of providing a pressurized air port for aiding in releasing the trailing edge of the label segment from the vacuum drum and aiding in applying the trailing edge to the container.

One feature of the invention is that separate cavities within the vacuum drum are supplied with independently controlled levels of vacuum. Independent control of vacuum allow for adjustment of the vacuum level at different periods within the labeling process. A label supplied from a magazine may require increased vacuum pressure where the label is separated from the stack of labels than the level of vacuum required during the glue application step or when the label is applied to the container. Independent control of vacuum maximizes flexibility in the labeling process. It is also anticipated that better control of vacuum can be achieved by providing separate vacuum sources for the vacuum drum and cutter.

In accordance with the invention, two three or even more zones of vacuum pressure may be provided by providing the appropriate number of cavities within the vacuum drum. Each cavity would be separately supplied with vacuum at the appropriate level. For example, a vacuum drum could be provided with three ports with one port of high vacuum pressure being provided at the location that adhesive is applied to the leading edge of the label with a lower level of vacuum being provided when the other portions of the label pass by the glue application station. A lesser degree of vacuum could be provided at the label pick up point if appropriate to maximize accuracy of label alignment and optimum label handling performance. Alternatively, if a precoated label is to be applied which is coated with a heat activatable adhesive greater vacuum pressure could be provided at the label pick up station with a lesser amount of vacuum being provided at the point heat is applied to the label to activate the adhesive.

These and other advantages of the present invention will become apparent to one of ordinary skill in the art in light of the following description and attached drawings.

BEST MODE FOR CARRYING OUT THE INVENTION

Figure 1:
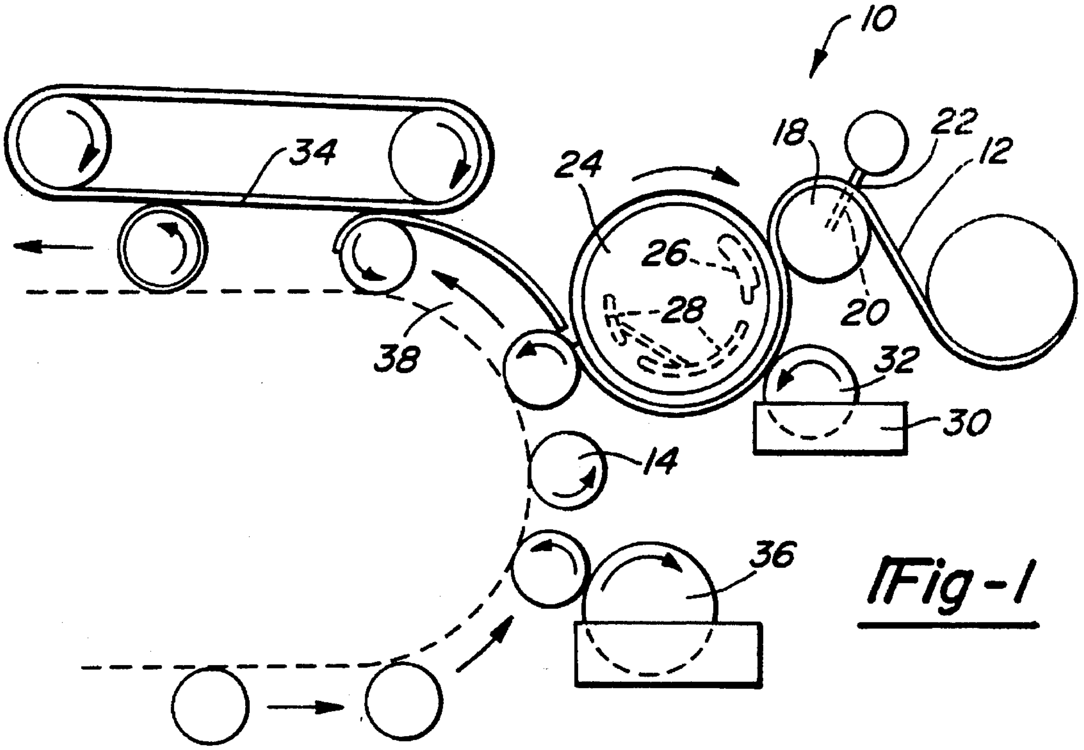
FIG. 1 is a schematic plan view of a labeling machine utilizing the labeling method of the present invention.

Referring now to FIG. 1, a labeling machine generally indicated by reference numeral 10 is shown schematically. Labeling material web 12 is supplied to the labeling machine 10 for application to containers 14. Labeling material web 12 is cut into label segments 16, by a cutter drum 18. Cutter drum 18 includes at least one cutter knife 20 which is rotated with the cutter drum 18. Cutter knife 20 cooperates with cutter knife 22 which is mounted stationarily and is periodically contacted by the rotating and cutter knife 20. A vacuum drum 24 is provided to pick up label segments 16 from the cutter drum 18 and hold the label segments until they are applied to the containers 14.

According to the invention, the vacuum drum 24 has a first cavity 26 and a second cavity 28. First and second cavities 26 and 28 are provided with vacuum from one or more vacuum sources and are maintained at different vacuum pressures. First cavity 26 is preferably provided with less vacuum than second cavity 28 so that when label segment 16 is transferred from the cutter drum 18 to the vacuum drum 24, tension on the label segment 16 is minimized to provide better cutting action with less tendency to split labels and to provide better control over label segment 16.

A glue applicator 30 is provided in conjunction with the vacuum drum 24. Glue applicator 30 includes a glue roller 32 which rolls glue onto portions of label segment 16 while the label segments 16 are held on the vacuum drum 24.

Label segments 16 are held on the vacuum drum 24 until the label segments 16 are applied to the containers 14. After application, containers are engaged by a compression belt 34, which presses the label segments 16 onto the containers 14. Prior to being labeled, containers 14 are held by a staging device 36. The staging device 36 may be a star wheel, roller or screw feed. The containers 14 are moved by means of a conveyor 38 into and out of the labeling machine.

Figure 2:
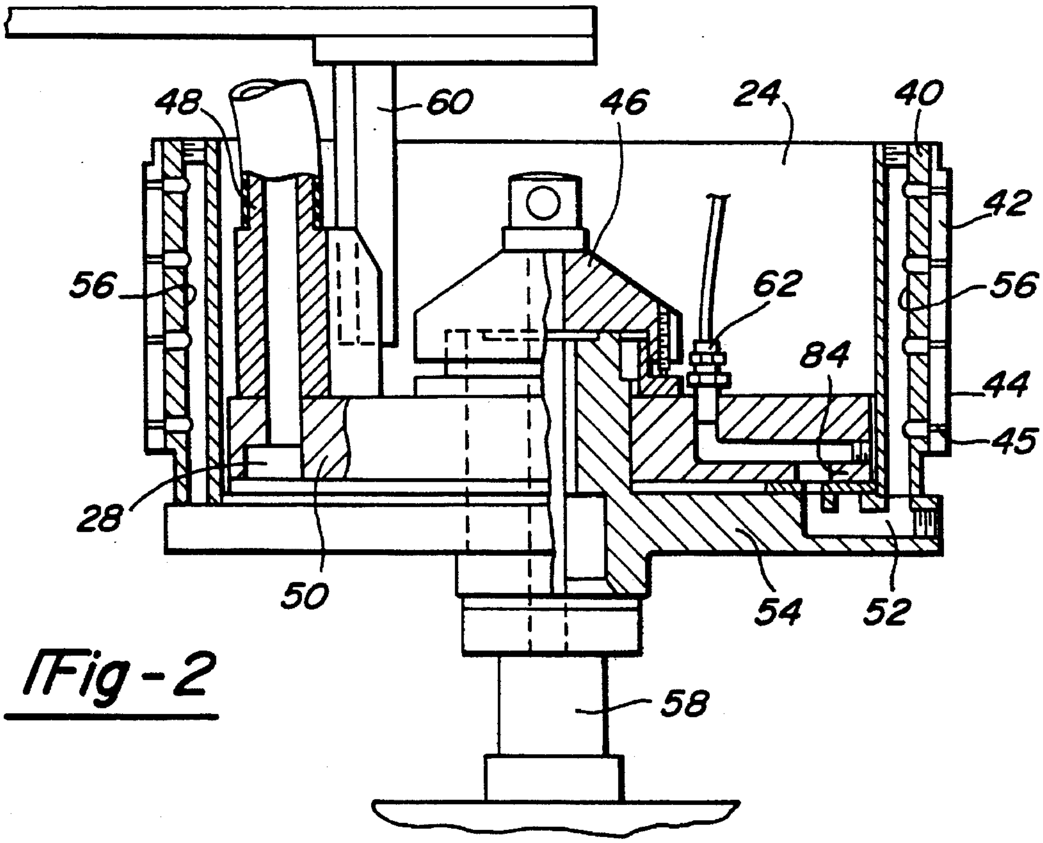
FIG. 2 is a cross-sectional view taken on the line 22 in FIG. 1.

Referring now to FIG. 2, the construction of the vacuum drum 24 is explained in greater detail. The vacuum drum 24 includes a cylindrical wall 40 to which pad 42 is secured. Vacuum ports 44 and 45 are provided in the cylindrical wall 40 and pad 42 respectively. First and second vacuum fittings 46 and 48 are attached to a stationary valve plate 50. If desired, three or more vacuum ports can be included on the vacuum drum if further segmentation of the vacuum drum is desired. Vacuum is supplied to the vacuum drum 20 or through the first and second vacuum fittings which provide vacuum within the vacuum drum 24 to first and second cavities 26 and 28. The stationary valve plate 50 provides a stationary member to which first and second vacuum fittings 46 and 48 are connected. Conduits 52 are formed within a base 54 of the vacuum drum 24. Vacuum provided to the stationary valve plate 50 is provided through the conduits 52 to conduits 56 formed in the cylindrical wall 40. As the base 54 and cylindrical wall 40 rotate relative to the stationary valve plate 50 the vacuum provided to the conduits 52 and 56 and vacuum ports 44 and 45, can be varied. Varying the vacuum provided to the vacuum ports 44 and 45 provides the advantages outlined above.

The drive shaft 58 is provided for rotating the base 54 and cylindrical wall 40 relative to the stationary valve plate 50. A bracket 60, as shown in FIG. 2, is provided to prevent the stationary valve plate 50 from rotating with the cylindrical wall 40 and base 54. A blow off port 62 is provided to facilitate transfer of label segments 16 from the vacuum drum 24 to a container 14. The blow off port 62 is provided at the point on the vacuum drum 24 that is initially contacted by containers 14.

Figure 3:
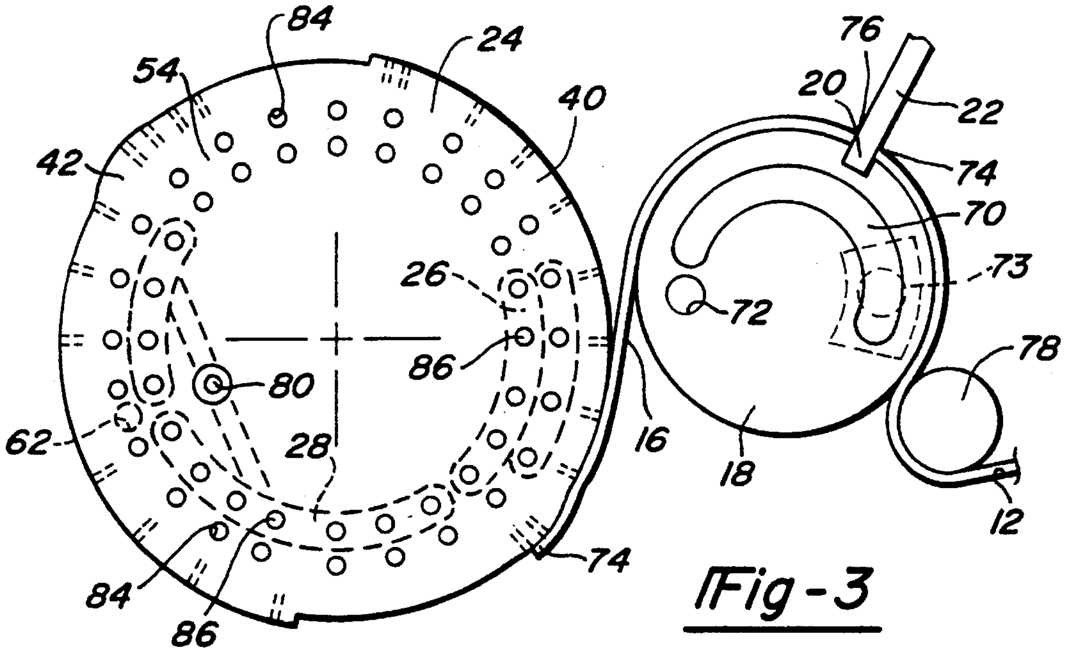
FIG. 3 is a fragmentary plan view of a cutter and vacuum drum for practicing the process of the present invention.

Referring now to FIG. 3, the base 54 is shown in conjunction with a cutter drum 18. Vacuum drum 24 includes a cylindrical wall 40, pad 42, and base 54, which move as a unit relative to the stationary valve plate 50. First and second cavities 26 and 28 are provided separately within the base 54 and are supplied separately with vacuum through the first and second vacuum fittings 46 and 48. Three or more vacuum fittings can be provided if the vacuum drum is segmented into three or more cavities.

The second cavity 28 can be further divided into two parts by means of a set screw control 80. A plurality of the first part of the second cavity is the glue application section of the vacuum drum. The second part of the second cavity is the label roll-on section of the vacuum drum. Base plate ports 84 are provided within the base 54. Base plate ports 84 are selectively provided with plugs 86 to control the flow of vacuum to the conduits 52 formed in the base plate 54.

Cutter drum 18 holds rotating cutter knife 20 for severing label segment 16 from the labeling material web 12. As the label segments 16 are transferred to the vacuum drum 24 a leading edge 74 of the segment is initially placed on the vacuum drum 24. A trailing edge 76 of the label segment 16 is the last portion of the label segment to be placed on the vacuum drum 24.

Referring to FIG. 3, the instant at which the label segment 16 is cut from the web 12 is illustrated wherein the leading edge 74 of the segment 16 is secured to the vacuum drum 24 while the trailing edge is secured to the cutter drum 18. It is at this point that tension in the label material can cause splitting or misalignment of the label if excessive tension is exerted by the vacuum drum 24 on the label segment 16 as it pulls the label segment 16 off of the cutter drum 18 and onto and around the vacuum drum 24. The cutter drum 18 includes an arcuate vacuum cavity 70. Blow off port 74 is provided to aid in separating the label segment 16 from the cutter drum and causing it to be picked up by the vacuum of the vacuum drum 24.

Figure 4:
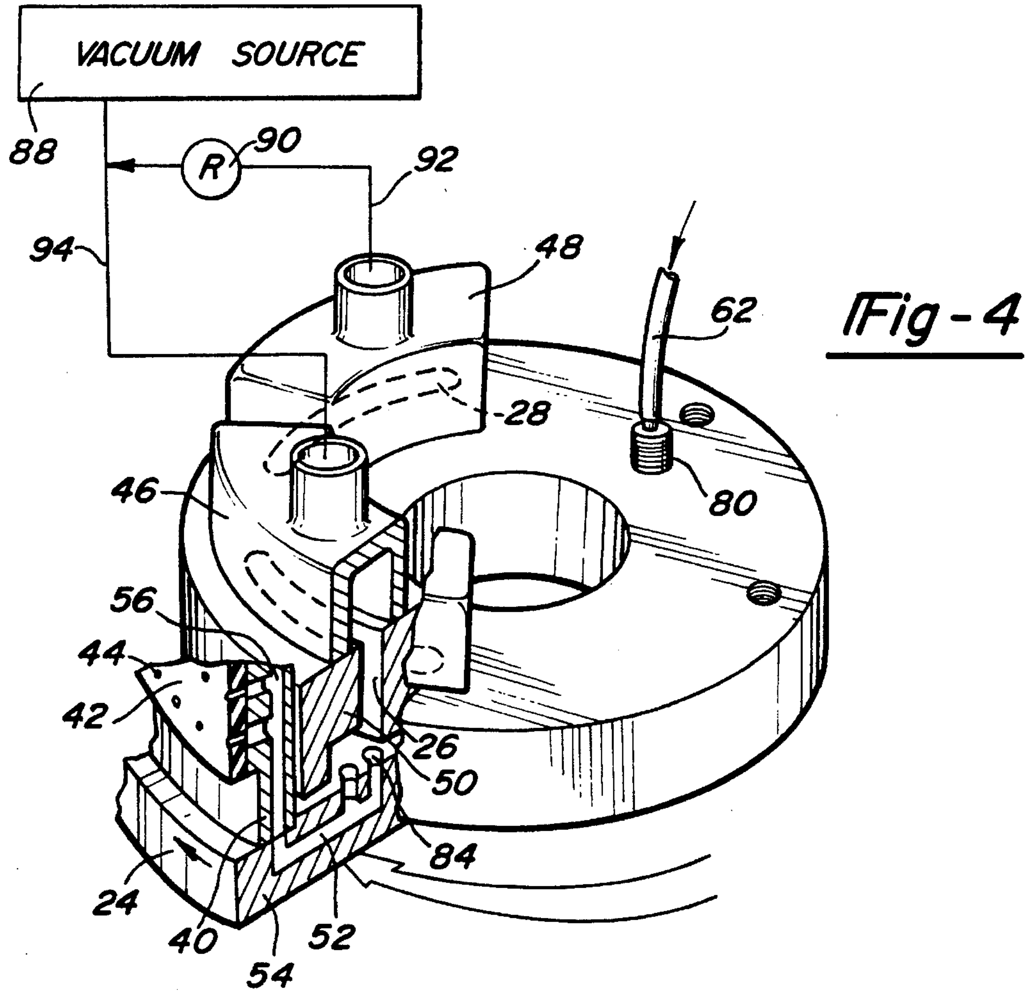
FIG. 4 is a fragmentary view of a vacuum drum having the multiple port vacuum source of the present invention shown schematically.

Referring now to FIG. 4, a vacuum source 88 provides vacuum to first and second vacuum fittings 46 and 48. To control the amount of vacuum provided to the second vacuum fitting 48, a valve 90 may be provided in the vacuum line 92 while the vacuum line 94 provides full vacuum available from the vacuum source 88 to the first vacuum fitting 46. In this way, two separate levels of vacuum pressure can be maintained within the cutter drum. Three or more levels of vacuum pressure can be maintained by providing additional cavities within the vacuum drum.

It has been found that the location of a vacuum fitting 73 on the cutter drum 18 can lead to a reduction in tension as the label segment 16 is transferred from the cutter drum to the vacuum drum. By placing the vacuum fitting 73 at the arcuate end of the vacuum cavity 70 on the side of the cutter drum initially contacting the web 12 instead of the label segment 16, a vacuum pressure gradient can be developed that reduces vacuum pressure on the label segments 16 while maintaining high vacuum pressure on the label material web 12. The label material web 12 is controlled and fed into the cutter drum 18 through a series of guide rollers 78. The vacuum pressure adjacent to fitting 73 is greatest with a gradual reduction in vacuum pressure due to lost vacuum through ports disposed about the circumference of the cutter drum 18.

The vacuum supplied to the cutter drum is preferably provided from a source independent of the vacuum drum to assure consistent vacuum levels.

Figure 5:
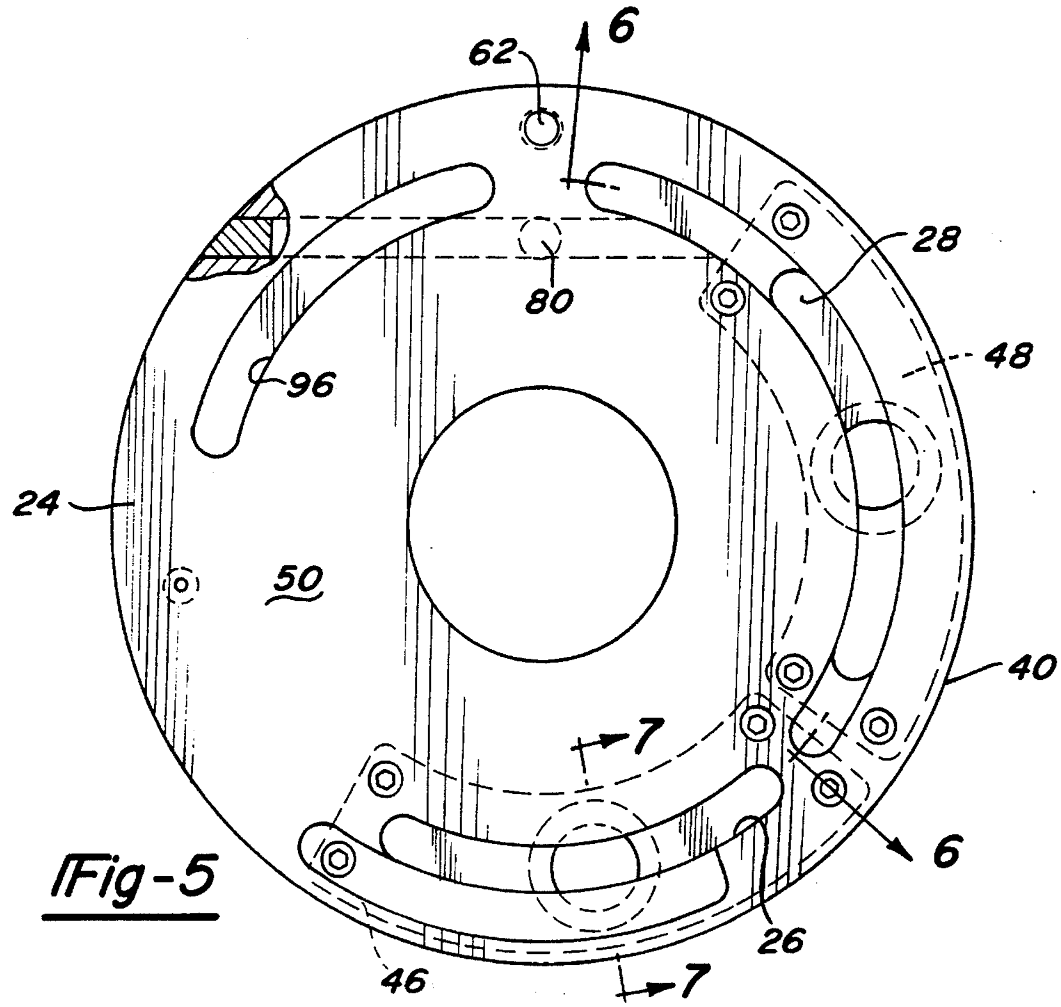
FIG. 5 is a bottom plan view of a vacuum drum made in accordance with the present invention.

Referring now to FIG. 5, the stationary valve plate 50 is shown in a bottom plan view. The stationary valve plate 50 provides the means for mounting first and second vacuum fittings 46 and 48 which provide vacuum to first and second cavities 26 and 28. A set screw control 80 can be provided to control vacuum supplied to a label application section of 96 of the second cavity 28.

Figure 6:
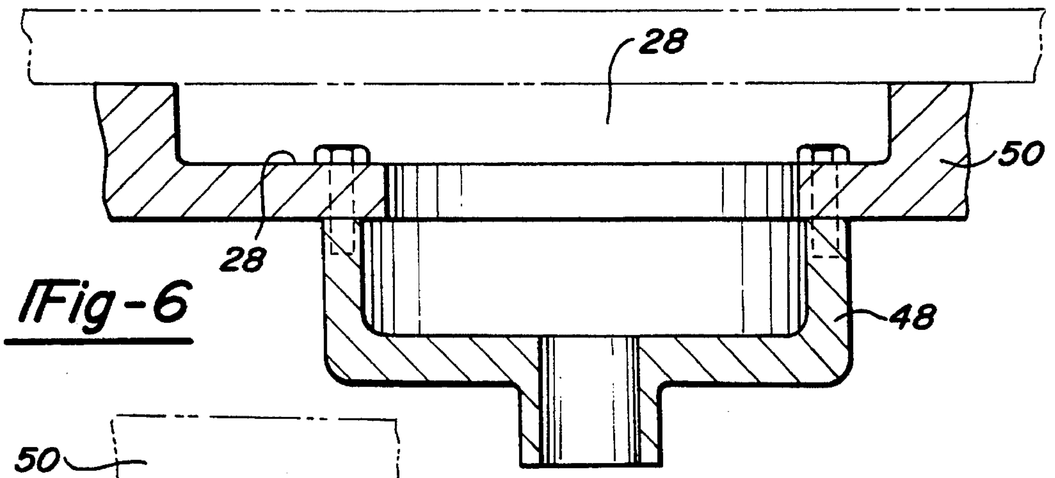
FIG. 6 is an inverted cross-sectional view taken on line 66 in FIG. 5.

Referring now to FIG. 6, the second vacuum fitting 48 is shown as it is attached to the stationary valve plate 50 to define the second cavity 28.

Figure 7:
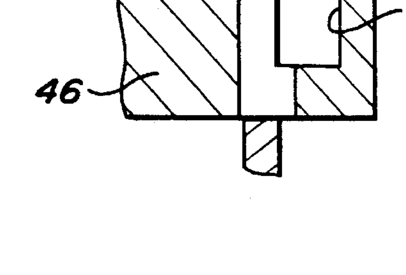
FIG. 7 is an inverted fragmentary cross-sectional view taken on line 77 in FIG. 5.

Referring now to FIG. 7, the first vacuum fitting 46 is shown secured to the stationary valve plate 50 to define the first cavity 26.

Figure 8:
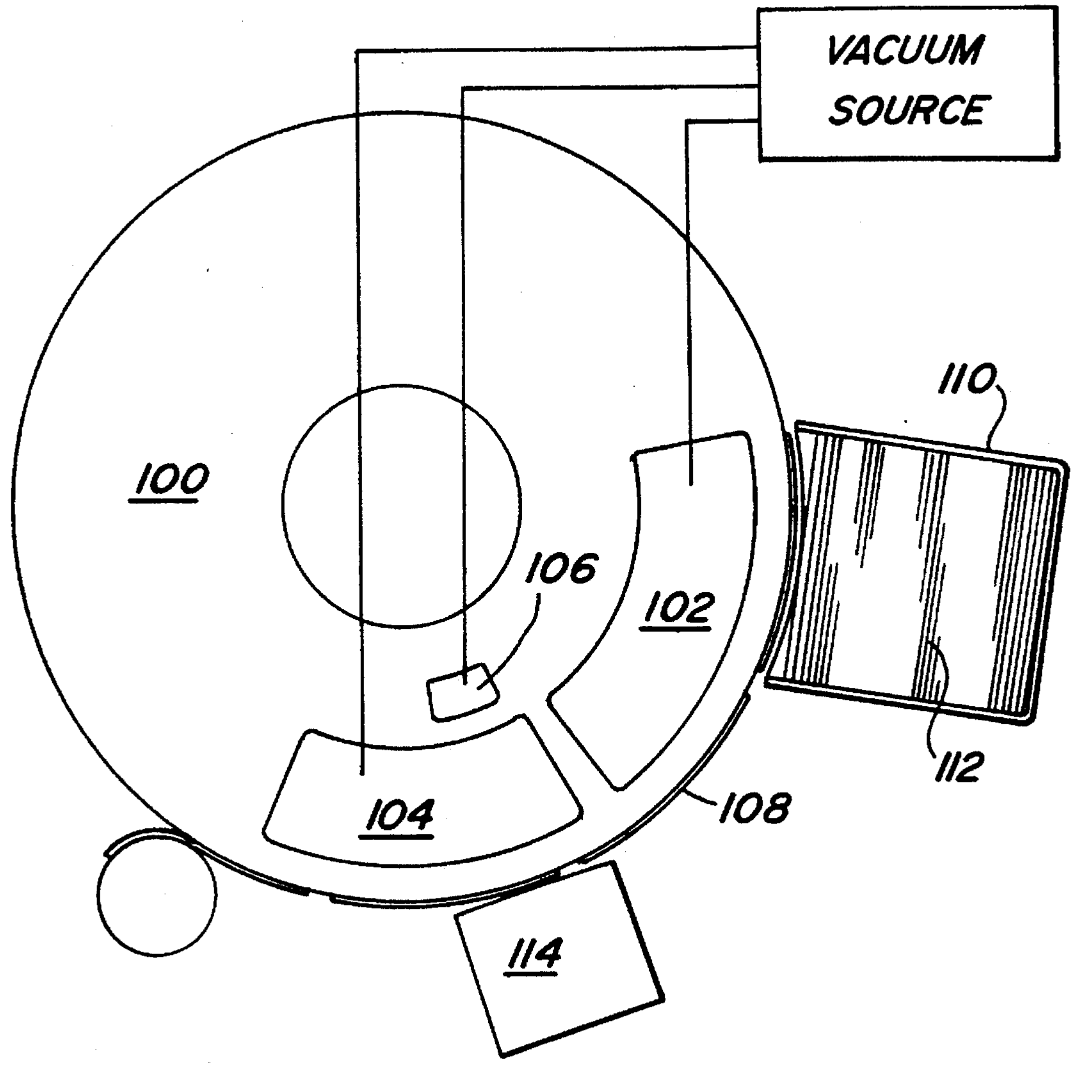
FIG. 8 is a schematic plan view of a vacuum drum having three cavities for supplying three independently controllable levels of vacuum.

Referring now to FIG. 8, an alternative embodiment of a vacuum drum 100 is shown wherein first second and third vacuum ports 102, 104 and 106 are provided to make available three different levels of vacuum that are ported to the vacuum drum surface 108. Also shown in FIG. 8 is a cut and stack label magazine 110 from which a stack of labels 112 may be supplied to the vacuum drum. Labels 112 are picked from the magazine 110 by the vacuum drum 100 when exposed to the first level of vacuum supplied through cavity 102.

As the label 112 is rotated by the vacuum drum 100 pass a treating apparatus 114 the label can be provided with vacuum from either the second or third cavities 104, 106. The treatment apparatus 114 may be a glue wheel, a glue spring device, or a localized heat application source. A localized heat application source would be usable with a label 112 having a previously applied coating of adhesive that is subsequently heat activatable being supported on a vacuum drum 100. Heat activatable adhesive could be activated by a hot air blast or any other mechanism for locally heating the surface of the label.

It should be appreciated that the present invention is adaptable to meet a wide variety of different labeling requirements. The independently controllable vacuum permits labeling with a wide variety of materials and labeling techniques. This flexibility permit a basic machine to apply many different types of materials utilizing different adhesive patterns and adhesive application techniques.

In operation, the label segments 16 are cut from the label material web 12 by the cutter drum 18. When the label web 12 is brought into contact with the cutter drum 18, the highest level of vacuum provided by the cutter drum is assured by locating the vacuum fitting 73 adjacent to the point on the cutter drum that initially picks up the labeling material web 12. The rotating cutter knife 20 and stationary cutter knife 22 cut the label segment 16 from the web 12 at a point on the cutter drum where lesser vacuum pressure is provided due to the distance from the vacuum fitting 73 of the cutter knife 20. The vacuum is reduced further as the distance from the vacuum fitting 73 increases. A blow off port 72 is provided adjacent to a point on the cutter drum 18 to blow off the label segment leading edge 74 toward the vacuum drum 24.

The first cavity 26 in the vacuum drum 24 is substantially adjacent cutter drum 18 and extends arcuately within the stationary valve plate 50 from the point on the vacuum drum adjacent to the cutter drum to a point preceding the glue applicator 30. By providing less vacuum pressure at the first cavity 26, label segments 16 are not subjected to full vacuum pressure at the time of cut-off or at the time of transfer thereby reducing the tendency of label segments 16 to split or to become misaligned as they are transferred from the cutter drum 18 to the vacuum drum 24.

As the label segments move with the base plate 54, cylindrical wall 40, and pad 42, the base plate ports 84 that were previously open to the first cavity 26 rotate until they open into the second cavity 28. When open to the second cavity 28, a different and higher level of vacuum is provided to the vacuum ports 44 in the pad 42. Increasing the vacuum holding the label segment 16 on the vacuum drum as it passes the glue applicator 30 prevents the label segment 16 from following the glue roller 32 that can lead to label segment 16 becoming caught in the glue applicator 30. The higher level vacuum provided in the second cavity 28 may be controlled in a label application section by set screw control 80. Label application portion 96 of the second cavity bridges over the blow off port 62.

The foregoing description of a mode of practicing the invention is intended to be illustrative of the best mode of the invention and is not to be read in a limiting sense. The scope of this invention should be construed by reference to the following broad claims.

What is claimed is:

1. A method of labeling containers comprising:

providing a web of labeling material;

severing the web into label segments;

feeding the label segments to a vacuum drum;

picking up the label segments by the vacuum drum with a first level of vacuum supplied through a first cavity located within the vacuum drum;

holding the label segments on the vacuum drum with a second level of vacuum supplied through a second cavity located within the vacuum drum, said second cavity being separate from the first cavity, and wherein said second level of vacuum is greater than the first level of vacuum;

acting on the label segments while the label segments are being held on the vacuum drum by the second level of vacuum; and applying the label segments to said containers.

2. The method of claim 1 wherein said step of severing the web into segments is performed by a cutter having a cylindrical wall through which vacuum is supplied to retain the web of labeling material during the severing step, said cutter having a knife extending radially outwardly from the cylindrical wall which is rotated relative to a cutting edge, said cutter having a vacuum supply port and an arcuate cavity extending from a first point adjacent the knife to a second point circumferentially spaced from the knife, said vacuum supply port opening into the arcuate cavity at a location closer to the second point than the first point, wherein the vacuum within the arcuate cavity is reduced adjacent the knife in comparison to the vacuum within the arcuate cavity adjacent the vacuum supply port.

3. The method of claim 2 wherein the reduced vacuum within the arcuate cavity adjacent the knife reduces tension on the web of labeling material during the severing step and wherein the comparatively greater vacuum within the arcuate cavity adjacent the vacuum supply port applies increased holding force on the web of labeling material at a circumferentially spaced location from the knife.

4. The method of claim 1 wherein said web of labeling material is provided in roll form and unrolled prior to being fed into the cutter.

5. The method of claim 1 wherein said step of feeding the label segments to the vacuum drum begins prior to the completion of the severing step and the first level of vacuum is maintained below a predetermined level to reduce tension on the label segments, whereby label segment misalignment on the vacuum drum and label breakage prior to completion of the severing step is minimized.

6. The method of claim 1 wherein said step of acting on the label segments comprises applying an adhesive to predetermined locations on the label segments.

7. The method of claim 6 wherein said adhesive is a solvent which forms an adherent surface in situ.

8. The method of claim 6 wherein said adhesive is hot melt glue.

9. The method of claim 6 wherein said adhesive is cold glue.

10. The method of claim 1 wherein said step of applying the label segments to the containers includes the further step of providing a port for pressurized air on the vacuum drum at the point on the vacuum drum where a trailing edge of the label segment is released from the vacuum drum and applied to the container.

11. A method of labeling containers comprising:

feeding a label to a rotating vacuum drum;

transferring the labels on the vacuum drum initially by a first controllable level of vacuum supplied through a first cavity in the vacuum drum;

holding the label on the vacuum drum by a second controllable level of vacuum supplied through a second cavity in the vacuum drum as the label is rotated by the vacuum drum;

treating a surface on the label as it is held by the second controllable level of vacuum, said first and second controllable levels of vacuum being independently controlled;

applying the label to a container while the label is partially held on the vacuum drum by the second controllable level of vacuum.

12. The method of labeling containers of claim 11 wherein during said treating step a third controllable level of vacuum is provided through a third cavity in the vacuum drum, said third cavity being ported to the surface of the vacuum drum at the point in the rotation of the vacuum drum where adhesive is applied to the leading edge of the label.

13. The method of labeling containers of claim 11 wherein said labels are cut into individual segments before said transferring step and said labels are precoated with an activatable adhesive, wherein said first controllable level of vacuum is maintained below the second controllable level of vacuum.

14. The method of claim 13 wherein said precoated adhesive is a heat activated adhesive printed on the label which is heated in a specific region while the label is held by the second controllable level of vacuum.

15. The method of claim 11 wherein said labels are fed during said feeding step from a stack of labels.

* * * * *